(12) United States Patent
Yamaoka

(10) Patent No.: US 9,179,084 B2
(45) Date of Patent: Nov. 3, 2015

(54) SOLID-STATE IMAGING DEVICE

(71) Applicant: Kabushiki Kaisha Toshiba, Minato-ku (JP)

(72) Inventor: Hiroaki Yamaoka, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/456,036

(22) Filed: Aug. 11, 2014

(65) Prior Publication Data

US 2015/0271424 A1 Sep. 24, 2015

(30) Foreign Application Priority Data

Mar. 20, 2014 (JP) ................................ 2014-057618

(51) Int. Cl.
*H04N 5/378* (2011.01)
*H04N 5/376* (2011.01)

(52) U.S. Cl.
CPC ............. *H04N 5/378* (2013.01); *H04N 5/376* (2013.01); *H04N 5/3765* (2013.01)

(58) Field of Classification Search
CPC . H04N 5/3741; H04N 5/3742; H04N 5/3745; H04N 5/37455; H04N 5/37457
USPC ......................................................... 348/308
See application file for complete search history.

(56) References Cited

U.S. PATENT DOCUMENTS

| | | | |
|---|---|---|---|
| 2011/0019039 A1 | 1/2011 | Ikuma et al. | |
| 2011/0273601 A1* | 11/2011 | Egawa | 348/300 |
| 2011/0279723 A1* | 11/2011 | Takamiya et al. | 348/308 |
| 2011/0317056 A1 | 12/2011 | Matsumoto | |
| 2013/0088625 A1 | 4/2013 | Iwata et al. | |
| 2015/0077610 A1* | 3/2015 | Shishido et al. | 348/303 |

FOREIGN PATENT DOCUMENTS

| | | |
|---|---|---|
| JP | 2005-223559 | 8/2005 |
| JP | 2011-29793 A | 2/2011 |
| JP | 2012-010008 | 1/2012 |
| JP | 2012-253818 A | 12/2012 |
| JP | 2013-085110 | 5/2013 |

OTHER PUBLICATIONS

Office Action issued May 21, 2015 in Korean Patent Application No. 10-2014-0109568 (with English language translation).

* cited by examiner

*Primary Examiner* — Tuan Ho
(74) *Attorney, Agent, or Firm* — Oblon, McClelland, Maier & Neustadt, L.L.P.

(57) ABSTRACT

According to one embodiment, a pixel array unit has pixels for accumulating photoelectric-converted charges arranged in a matrix in a row direction and a column direction; a column ADC circuit calculates, based on results of comparison between pixel signals read from the pixels and a reference voltage, AD-converted values of the pixel signals in each of columns; vertical signal wires transmit the pixel signals read from the pixels in each of the columns to the column ADC circuit; and a load circuit is dispersed in the row direction and forms source follower circuits with the pixels to read pixel signals from the pixels in each of the columns to the vertical signal wires.

20 Claims, 7 Drawing Sheets

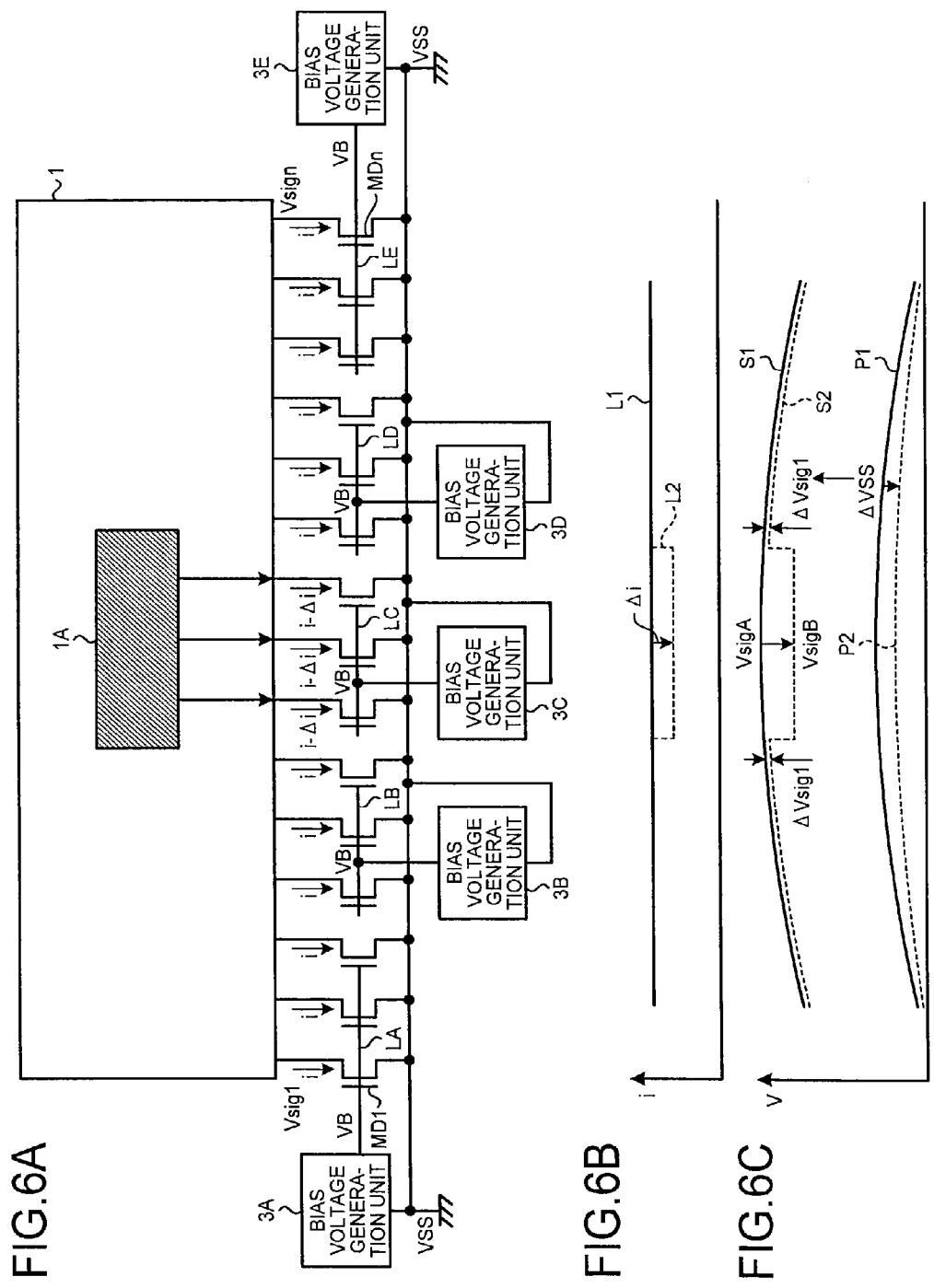

SOLID-STATE IMAGING DEVICE

CROSS-REFERENCE TO RELATED APPLICATIONS

This application is based upon and claims the benefit of priority from Japanese Patent Application No. 2014-57618, filed on Mar. 20, 2014; the entire contents of which are incorporated herein by reference.

FIELD

Embodiments described herein relate generally to a solid-state imaging device.

BACKGROUND

There is a method for reading pixel signals in parallel in each of columns a solid-state imaging device by which a source follower circuit is configured between pixels in each of the columns on reading of the signals.

BRIEF DESCRIPTION OF THE DRAWINGS

FIG. 6A is a block diagram of a configuration example of a load circuit that is applied to a solid-state imaging device according to a second embodiment, FIG. 6B is a diagram illustrating fluctuations in current flowing through the load transistors illustrated in FIG. 6A, and FIG. 6C is a diagram illustrating fluctuations in signal level and reset level of a pixel signal when bias voltage generation units are dispersed.

DETAILED DESCRIPTION

In general, according to one embodiment, a solid-state imaging device includes a pixel array unit, a column ADC circuit, vertical signal wires, and a load circuit. The pixel array unit has pixels for accumulating photoelectric-converted charges arranged in a matrix in a row direction and in a column direction. The column ADC circuit calculates, based on results of comparison between pixel signals read from the pixels and a reference voltage, AD-converted values of the pixel signals in each of the columns. The vertical signal wire transmits the pixel signals read from the pixels in each of the columns to the column ADC circuit. The load circuit forms source follower circuits with the pixels to read pixels signals in each of the columns to the vertical signal wires. The load circuit is dispersed in the row direction and includes bias voltage generation units that generate bias voltages in the source follower circuits.

Exemplary embodiments of the solid-state imaging device will be explained below in detail with reference to the accompanying drawings. The present invention is not limited to the following embodiments.

First Embodiment

Figure 1:
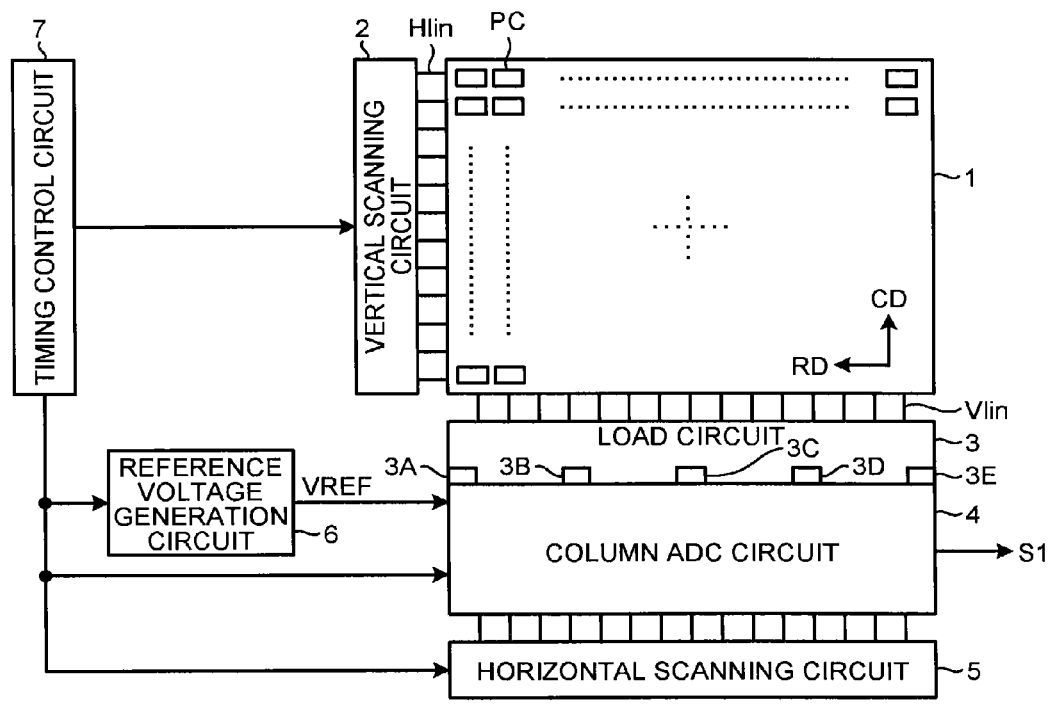
FIG. 1 is a schematic block diagram of a functional configuration of a solid-state imaging device according to a first embodiment.

FIG. 1 is a schematic block diagram of a functional configuration of a solid-state imaging device according to a first embodiment.

Referring to FIG. 1, the solid-state imaging device is provided with a pixel array unit 1. The pixel array unit 1 has pixels PC for accumulating photoelectric-converted charges arranged in a matrix of m (m is a positive integer) rows by n (n is a positive integer) columns in row direction RD and column direction CD. The pixel array unit 1 is also provided with horizontal drive wires Hlin for driving the pixels PC in the row direction RD and vertical signal wires Vlin for transmitting signals read from the pixels PC in the column direction CD.

In addition, the solid-state imaging device is provided with a vertical scanning circuit 2 that vertically scans the pixels PC to be read; a load circuit 3 that forms source follower circuits with the pixels PC to read pixel signals from the pixels PC in each of the columns into the vertical signal wires Vlin; a column ADC circuit 4 that detects by CDS signal components of the pixels PC in each of the columns; a horizontal scanning circuit 5 that horizontally scans the pixels PC to be read; a reference voltage generation circuit 6 that outputs a reference voltage VREF to the column ADC circuit 4; and a timing control circuit 7 that controls reading of the pixels PC and timing of accumulation. The load circuit 3 is provided with bias voltage generation units 3A to 3E that generate bias voltages in the source follower circuits reading the pixel signals. The bias voltage generation units 3A to 3E are dispersed in the row direction RD.

Then, when the pixels PC are vertically scanned by the vertical scanning circuit 2, the pixels PC are selected in the row direction RD. Then, at the load circuit 3, when a source follower operation is performed with the pixels PC under the bias voltages from the bias voltage generation units 3A to 3E, the pixel signals read from the pixels PC are transmitted to the column ADC circuit 4 via the vertical signal wires Vlin. In addition, at the reference voltage generation circuit 6, a ramp wave is set as reference voltage VREF and sent to the column ADC circuit 4. Then, at the column ADC circuit 4, a clock count operation is performed until the signal level and the reset level read from the pixels PC agree with the level of the ramp wave, and a difference is determined between the signal level and the reset level at that time to detect the signal components of the pixels PC by CDS, and the signal components are output as an output signal S1.

By dispersing the bias voltage generation units 3A to 3E in the row direction RD, it is possible to suppress transfer of fluctuations in reference level at the bias voltage generation units 3A to 3E from one column to another. Accordingly, even if light of high intensity locally enters the pixels PC in one column, suppress fluctuations in level of pixel signals in another column, thereby to reduce streaking (transverse streak noise).

Figure 2:
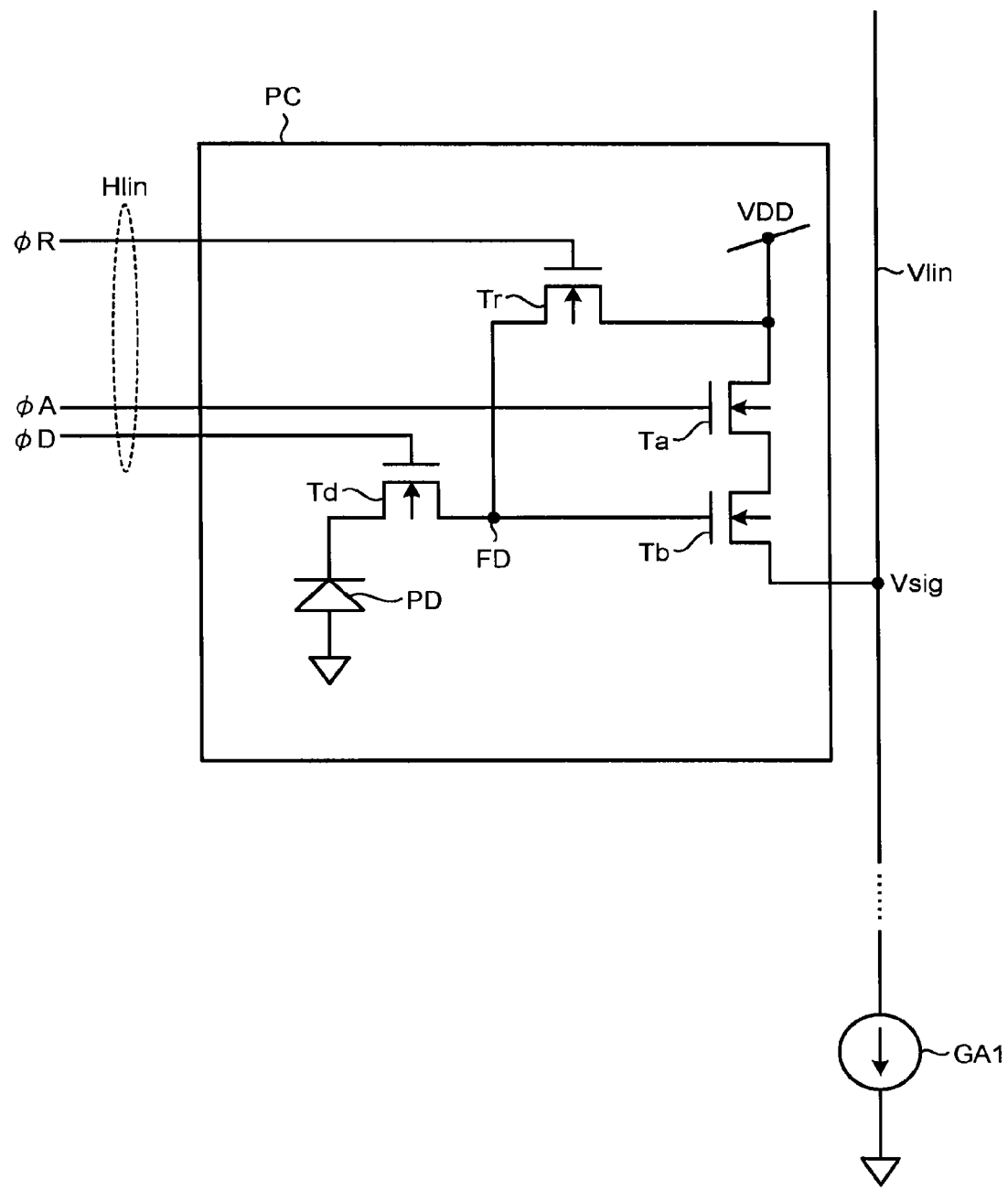
FIG. 2 is a circuit diagram illustrating a configuration example of a pixel in the solid-state imaging device illustrated in FIG. 1.

FIG. 2 is a circuit diagram illustrating a configuration example of a pixel in the solid-state imaging device illustrated in FIG. 1.

Referring to FIG. 2, each of the pixels PC is provided with a photodiode PD, a row selection transistor Ta, an amplification transistor Tb, a reset transistor Tr, and a read transistor Td. A floating diffusion FD is formed as a detection node at a connection point of the amplification transistor Tb, the reset transistor Tr, and the read transistor Td.

In the pixel PC, a source of the read transistor Td is connected to the photodiode PD, and a read signal ΦDD is input into a gate of the read transistor Td. A source of the reset transistor Tr is connected to a drain of the read transistor Td, a reset signal ΦR is input into a drain of the reset transistor Tr, and a drain of the reset transistor Tr is connected to a power source potential VDD. A row selection signal ΦA is input into a gate of the row selection transistor Ta, a drain of the row selection transistor Ta is connected to the power source potential VDD. A source of the amplification transistor Tb is connected to the vertical signal wire Vlin, a gate of the amplification transistor Tb is connected to a drain of the read transistor Td, and a drain of the amplification transistor Tb is connected to a source of the row selection transistor Ta. The horizontal control wires Hlin illustrated in FIG. 1 can transmit the read signal ΦD, the reset signal ΦR, and the row selection signal ΦA to the pixels PC in each of the rows. Constant current sources GA1 are provided to the load circuit 3 illustrated in FIG. 1 in each of the columns, and the constant current sources GA1 are connected to the vertical signal wires Vlin. The bias voltage generation units 3A to 3E can generate bias voltages for the constant current sources GA1 in the respective columns.

Figure 3:
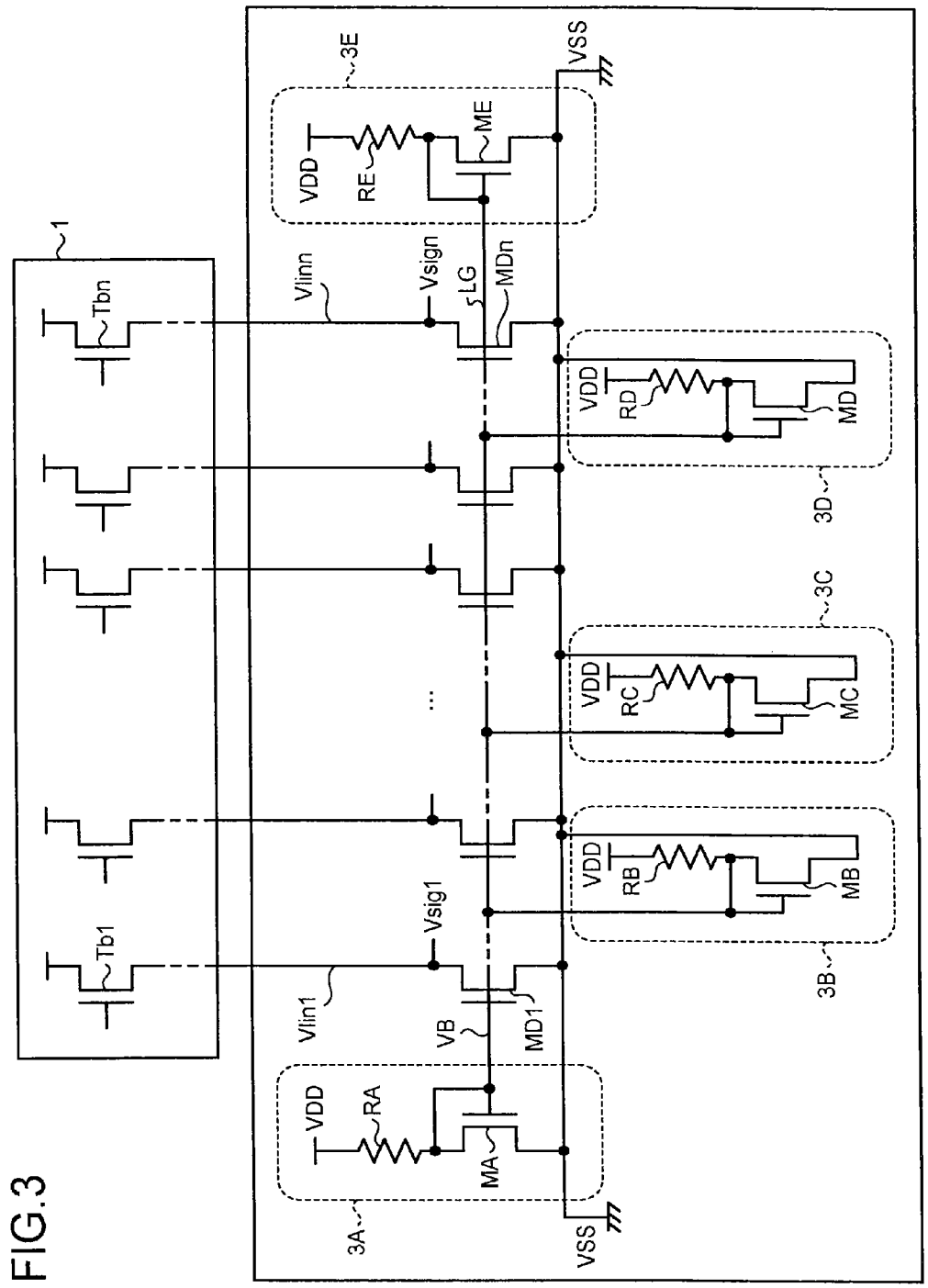
FIG. 3 is a circuit diagram illustrating a configuration example of a load circuit in the solid-state imaging device illustrated in FIG. 1.

FIG. 3 is a circuit diagram illustrating a configuration example of a load circuit in the solid-state imaging device illustrated in FIG. 1.

Referring to FIG. 3, the pixel array unit 1 is provided with the vertical signal wires Vlin1 to Vlinn in each of the columns. The pixels PC in each of the rows in the pixel array unit 1 are provided with amplification transistors Tb1 to Tbn in each of the columns. The load circuit 3 is provided with load transistors MD1 to MDn in each of the columns. The load transistors MD1 to MDn can operate as the constant current sources GA1 illustrated in FIG. 2. The load transistors MD1 to MDn can use N-channel transistors, for example. Drains of the load transistors MD1 to MDn are connected to the vertical signal wires Vlin1 to Vlinn, respectively, sources of the load transistors MD1 to MDn are connected to a reference potential VSS, and gates of the load transistors MD1 to MDn are connected to a bias voltage transmission wire LG. The reference potential VSS can be set as a ground potential, for example.

The bias voltage generation units 3A to 3E are provided with bias transistors MA to ME and resistors RA to RE, respectively. The bias transistors MA to ME can use N-channel transistors, for example. Drains of the bias transistors MA to ME are connected to the power source potentials VDD via the resistors RA to RE, respectively. Sources of the bias transistors MA to ME are connected to the reference potentials VSS. Gates of the bias transistors MA to ME are connected to the drains of the bias transistors MA to ME.

Then, bias voltages VB output from the drains of the bias transistors MA to ME are applied to the gates of the load transistors MD1 to MDn via the bias voltage transmission wire LG.

Since source follower circuits are formed by the load transistors MD1 to MDn and the amplification transistors Tb1 to Tbn in each of the columns, pixel signals Vsig1 to Vsign are output in parallel in each of the columns.

Figure 4:
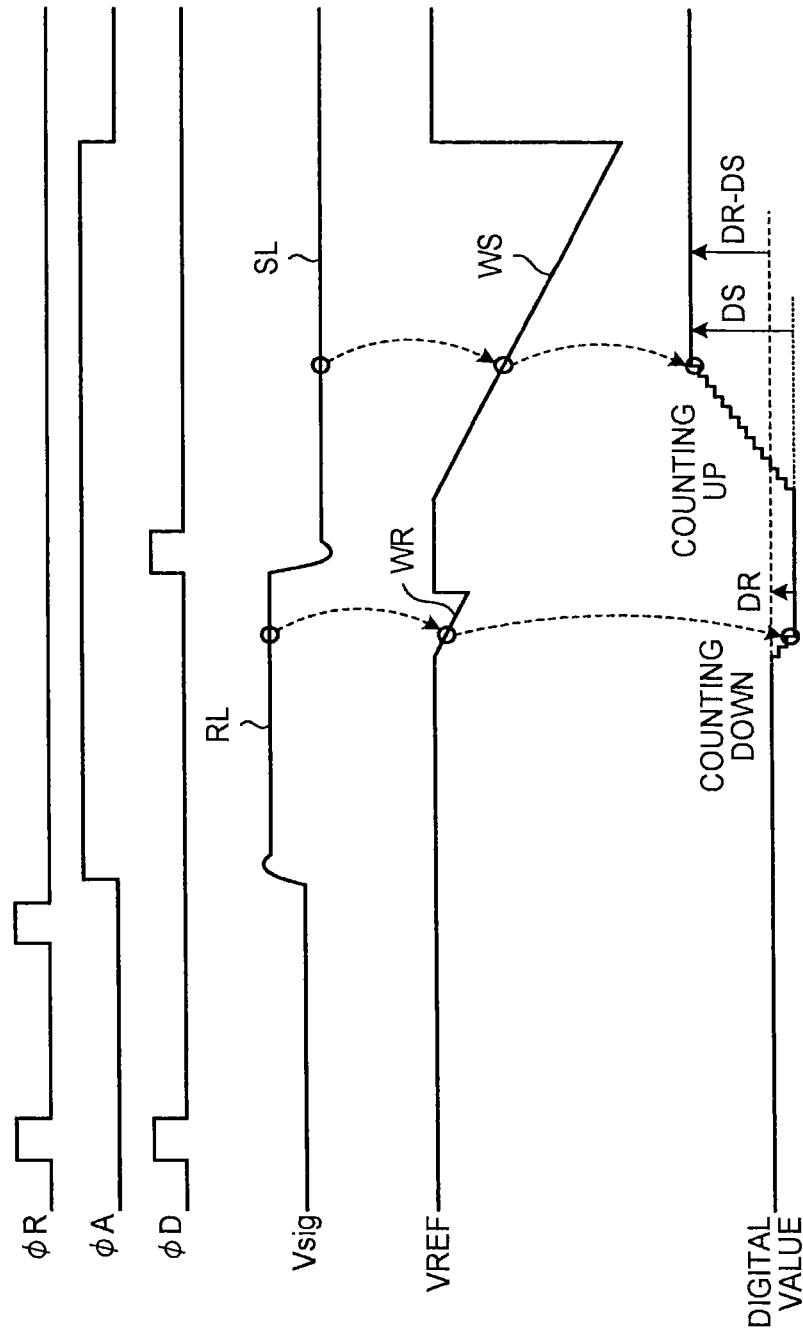
FIG. 4 is a timing flowchart of voltage waveforms of respective components during pixel reading illustrated in FIG. 1.

FIG. 4 is a timing flowchart of voltage waveforms of respective components during pixel reading illustrated in FIG. 1.

Referring to FIG. 4, in the case where the row selection signal ΦA is in low level, the row selection transistor Ta is in off state and does not perform a source follower operation, and thus no signal is output to the vertical signal wires Vlin. If the read signal ΦD and the reset signal ΦR become high, the read transistor Td is turned on to discharge charges accumulated in the photodiode PD to the floating diffusion FD. Then, the charges are discharged to the power source potential VDD via the reset transistor Tr.

After the charges accumulated in the photodiode PD are discharged to the power source potential VDD, when the read signal ΦD becomes low, accumulation of effective signal charges is started in the photodiode PD.

Next, on the rising edge of the reset signal ΦR, the reset transistor Tr is turned on and excessive charges generated due to leak current in the floating diffusion FD are reset.

Then, when the row selection signal ΦA becomes high, the row selection transistor Ta in the pixel PC is turned on, and then the power source potential VDD is applied to the drain of the amplification transistor Tb, whereby a source follower circuit is formed by the amplification transistor Tb and the constant current source GA1. Then, a voltage corresponding to a reset level RL of the floating diffusion FD is applied to the gate of the amplification transistor Tb. Since the source follower circuit is formed by the amplification transistor Tb and the constant current source GA1, the voltage of the vertical signal wire Vlin follows the voltage applied to the gate of the amplification transistor Tb, and the pixel signal Vsig of the reset level RL is output to the column ADC circuit 4 via the vertical signal wire Vlin.

At that time, a ramp wave WR is given as reference voltage VREF, and the pixel signal Vsig of the reset level RL is compared to the reference voltage VREF. Then, the pixel signal Vsig of the reset level RL is counted down until the reset level RL of the pixel signal Vsig agrees with the level of the reference voltage VREF, whereby the pixel signal Vsig of the reset level RL is converted into a digital value DR and held as such.

Next, on the rising edge of the read signal ΦD, the read transistor Td is turned on, the charges accumulated in the photodiode PD are transferred to the floating diffusion FD, and a voltage corresponding to a signal level SL of the floating diffusion FD is applied to the gate of the amplification transistor Tb. Since the source follower circuit is formed by the amplification transistor Tb and the constant current source GA1, the voltage of the vertical signal wire Vlin follows the voltage applied to the gate of the amplification transistor Tb, and the pixel signal Vsig of the signal level SL is output to the column ADC circuit 4 via the vertical signal wire Vlin.

At that time, the ramp wave WS is given as reference voltage VREF, and the pixel signal Vsig of the signal level SL is compared to the reference voltage VREF. Then, the pixel signal Vsig of the signal level SL is then counted up until the level of the pixel signal Vsig agrees with the level of the reference voltage VREF, whereby the pixel signal Vsig of the signal level SL is converted into a digital value DS. Then, a difference DR-DS between the pixel signal Vsig of the reset level RL and the pixel signal Vsig of the signal level SL is held and output as an output signal S1.

Figures 5A, 5B, 5C:
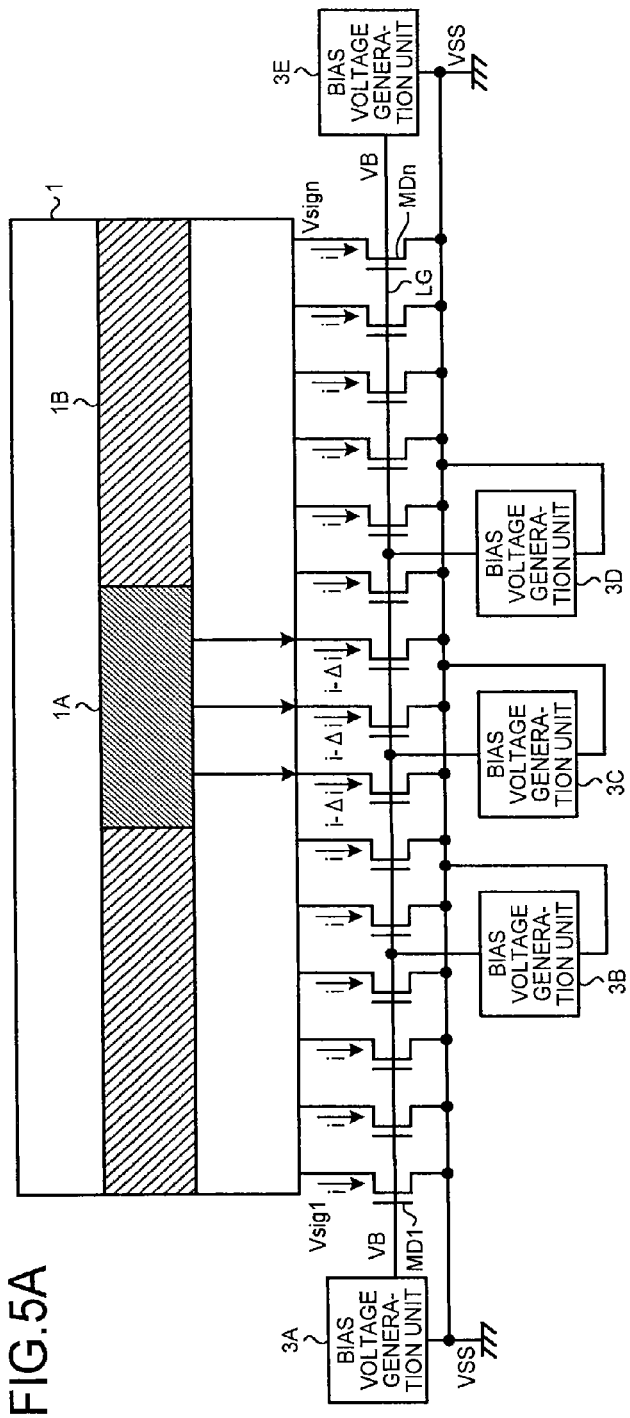
FIG. 5A is a block diagram of a configuration example of the load circuit illustrated in FIG. 3.
FIG. 5B is a diagram illustrating a fluctuation in current flowing through the load transistors illustrated in FIG. 5A.
FIG. 5C is a diagram illustrating fluctuations in signal level and reset level of a pixel signal when bias voltage generation units are dispersed, as compared to the case where the bias voltage generation units are arranged at one place.

FIG. 5A is a block diagram of a configuration example of the load circuit illustrated in FIG. 3, FIG. 5B is a diagram illustrating a fluctuation in current flowing through the load transistors illustrated in FIG. 5A, and FIG. 5C is a diagram illustrating fluctuations in signal level and reset level of a pixel signal when bias voltage generation units are dispersed, as compared to the case where the bias voltage generation units are arranged at one place.

Referring to FIG. 5A, it is assumed that light of high intensity enters a local region 1A of the pixel array unit 1. At that time, in the columns of the local region 1A, the amount of current i flowing through the load transistors MD1 to MDn decreases. When the decrease is designated as Δi, the amount of the current becomes i−Δi. Thus, as illustrated in FIG. 5B, distribution of the current i flowing through the load transistors MD1 to MDn changes from L1 to L2. As a result, as illustrated in FIG. 5C, a voltage fluctuation ΔVSS occurs between distribution P1 of the reference potential VSS at detection of the reset level RL of the pixel signal Vsig and distribution P2 of the reference potential VSS at detection of the signal level SL of the pixel signal Vsig.

Here, it is assumed that only the bias voltage generation unit 3A is provided at one place of the load circuit 3 and there are no bias voltage generation units 3B to 3E. In this case, a voltage fluctuation ΔVsig2 occurs between distribution S1 of a pixel signal VsigA at detection of the reset level RL of the pixel signal Vsig and distribution S3 of a pixel signal VsigB at detection of the signal level SL of the pixel signal Vsig. Accordingly, the level of the pixel signal VsigB fluctuates even in the columns surrounding the local region 1A, and streaking 1B is generated in correspondence with the voltage fluctuation ΔVsig2.

Meanwhile, it is assumed that the bias voltage generation units 3A to 3E are dispersed in the row direction RD at the load circuit 3. In this case, if the voltage fluctuation ΔVSS occurs in the columns surrounding the local region 1A, the reference potentials VSS of the bias voltage generation units 3A to 3E in the vicinity of the columns surrounding the local region 1A also change. Accordingly, the bias voltages VB of the load transistors MD1 to MDn in the columns surrounding the local region 1A change, and the changes in the current flowing through the load transistors MD1 to MDn resulting from the voltage fluctuation ΔVSS in the columns surrounding the local region 1A are cancelled out. As a result, the distribution of the pixel signal VsigB at detection of the signal level SL of the pixel signal Vsig turns from S3 to S2, and the voltage fluctuation between the distribution S1 of the pixel signal VsigA at detection of the reset level RL of the pixel signal Vsig and the distribution S2 of the pixel signal VsigB at detection of the signal level SL of the pixel signal Vsig turns from ΔVsig2 to ΔVsig1. Accordingly, the fluctuation in the level of the pixel signal VsigB in the columns surrounding the local region 1A can be decreased to reduce the streaking 1B.

Second Embodiment

FIG. 6A is a block diagram of a configuration example of a load circuit that is applied to a solid-state imaging device according to a second embodiment, FIG. 6B is a diagram illustrating fluctuations in current flowing through the load transistors illustrated in FIG. 6A, and FIG. 6C is a diagram illustrating fluctuations in signal level and reset level of a pixel signal when bias voltage generation units are dispersed.

In the configuration of FIG. 5A, the bias voltage transmission wire LG is provided for shared use by the bias voltage generation units 3A to 3E. In contrast to this, in the configuration of FIG. 6A, the bias voltage transmission wire LG is divided for each of the bias voltage generation units 3A to 3E, so that bias voltage transmission wires LA to LE are provided in correspondence with the bias voltage generation units 3A to 3E, respectively.

It is assumed that light of high intensity enters a local region 1A of the pixel array unit 1. At that time, in the columns of the local region 1A, the amount of current i flowing through the load transistors MD1 to MDn decreases. When the decrease is designated as Δi, the amount of the current becomes i−Δi. Thus, as illustrated in FIG. 6B, distribution of the current i flowing through the load transistors MD1 to MDn changes from L1 to L2. As a result, as illustrated in FIG. 6C, a voltage fluctuation ΔVSS occurs between distribution P1 of the reference potential VSS at detection of the reset level RL of the pixel signal Vsig and distribution P2 of the reference potential VSS at detection of the signal level SL of the pixel signal Vsig.

If the voltage fluctuation ΔVSS occurs in the columns surrounding the local region 1A, the reference potentials VSS of the bias voltage generation units 3A to 3E in the vicinity of the columns surrounding the local region 1A also change. Accordingly, the bias voltages VB of the load transistors MD1 to MDn in the columns surrounding the local region 1A change, and the changes in the current flowing through the load transistors MD1 to MDn resulting from the voltage fluctuation ΔVSS in the columns surrounding the local region 1A are cancelled out. As a result, a voltage fluctuation ΔVsig1 between the distribution S1 of the pixel signal VsigA at detection of the reset level RL of the pixel signal Vsig and the distribution S2 of the pixel signal VsigB at detection of the signal level SL of the pixel signal Vsig becomes smaller, which makes it possible to reduce streaking generated in the columns surrounding the local region 1A.

By dividing the bias voltage transmission wire LG for each of the bias voltage generation units 3A to 3E, it is possible to prevent fluctuations in the bias voltage VB from interfering with each other between the bias voltage generation units 3A to 3E.

In the embodiment described above, the five bias voltage generation units 3A to 3E are dispersed in the row direction RD. Alternatively, two or more bias voltage generation units may be dispersed in the row direction RD.

Third Embodiment

Figure 7:
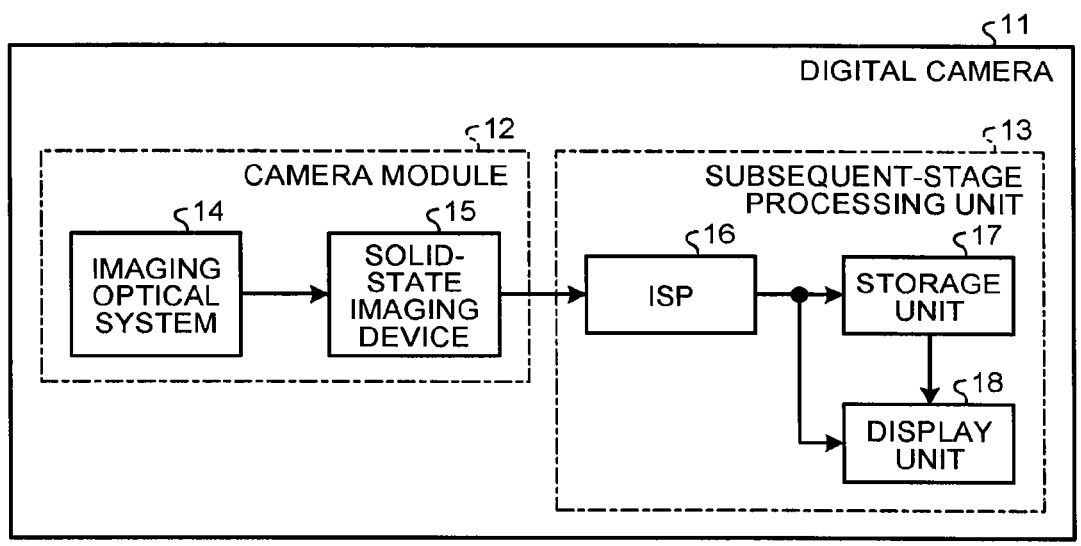
FIG. 7 is a schematic block diagram of a functional configuration of a digital camera to which a solid-state imaging device according to a third embodiment is applied.

FIG. 7 is a schematic block diagram of a functional configuration of a digital camera to which a solid-state imaging device according to a third embodiment is applied.

Referring to FIG. 7, a digital camera 11 has a camera module 12 and a subsequent-stage processing unit 13. The camera module 12 has an imaging optical system 14 and a solid-state imaging device 15. The subsequent-stage processing unit 13 has an image signal processor (ISP) 16, a storage unit 17, and a display unit 18. At least portion of the ISP 16 may be configured to form one chip together with the solid-state imaging device 15. The solid-state imaging device 15 may have the configuration illustrated in FIG. 1 or 6.

The imaging optical system 14 captures light from a subject and forms an image of the subject. The solid-state imaging device 15 takes the image of the subject. The ISP 16 processes an image signal obtained from the imaging at the solid-state imaging device 15. The storage unit 17 stores the image having undergone the signal processing at the ISP 16. The storage unit 17 outputs the image signal to the display unit 18 according to the user's operation or the like. The display unit 18 displays the image according to the image signal input from the ISP 16 or the storage unit 17. The display unit 18 is a liquid crystal display, for example. The camera module 12 may be applied to not only the digital camera 11 but also electronic devices such as a camera-equipped mobile phone, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device, comprising:
   a pixel array unit in which pixels for accumulating photoelectric-converted charges are arranged in a matrix in a row direction and a column direction;
   a column ADC circuit that, based on results of comparison between pixel signals read from the pixels and a reference voltage, calculates AD-converted values of the pixel signals in each of columns;
   vertical signal wires that transmit the pixel signals read from the pixels in each of the columns to the column ADC circuit; and
   a load circuit that forms source follower circuits with the pixels to read pixel signals from the pixels in each of the columns to the vertical signal wire, wherein
   the load circuit includes bias voltage generation units that are dispersed in the row direction to generate bias voltages in the source follower circuits.

2. The solid-state imaging device according to claim 1, wherein the load circuit includes a load transistor operating as a constant current source in each of the columns.

3. The solid-state imaging device according to claim 2, wherein the bias voltage generation units include bias transistors that generate the bias voltages.

4. The solid-state imaging device according to claim 3, wherein the bias voltage transmission wire configured to transmit the bias voltages to the load transistors is divided for each of the bias voltage generation units.

5. The solid-state imaging device according to claim 4, wherein
   gates of the load transistors are connected to the bias voltage transmission wire,
   drains of the load transistors are connected to the vertical signal wires, and
   sources of the load transistors are connected to ground potentials.

6. The solid-state imaging device according to claim 5, wherein
   gates of the bias transistors are connected to the bias voltage transmission wire,
   drains of the bias transistors are connected to power source potentials via resistors, and
   sources of the bias transistors are connected to ground potentials.

7. The solid-state imaging device according to claim 3, wherein the bias voltage transmission wire configured to transmit the bias voltages to the load transistors is shared by the bias voltage generation units.

8. The solid-state imaging device according to claim 7, wherein
   gates of the load transistors are connected to the bias voltage transmission wire,
   drains of the load transistors are connected to the vertical signal wires, and
   sources of the load transistors are connected to ground potentials.

9. The solid-state imaging device according to claim 8, wherein
   gates of the bias transistors are connected to the bias voltage transmission wire,
   drains of the bias transistors are connected to power source potentials via resistors, and
   sources of the bias transistors are connected to ground potentials.

10. The solid-state imaging device according to claim 1, wherein each of the pixels includes:
    a photodiode that accumulates photoelectric-converted charges;
    a row selection transistor that selects the pixels in a row direction;
    an amplification transistor that detects a signal read from the photodiode;
    a reset transistor that resets a signal read from the photodiode; and
    a read transistor that reads a signal from the photodiode.

11. A solid-state imaging device, comprising:
    a pixel array unit in which pixels for accumulating photoelectric-converted charges are arranged in a matrix in a row direction and a column direction;
    a column ADC circuit that, based on results of comparison between pixel signals read from the pixels and a reference voltage, calculates AD-converted values of the pixel signals in each of columns;
    vertical signal wires that transmit pixel signals read from the pixels in each of the columns to the column ADC circuit; and
    a load circuit that forms source follower circuits with the pixels to read the pixel signals from the pixels in each of the columns to the vertical signal wires, wherein the load circuit includes:
    a first bias voltage generation unit that generates bias voltages in the source follower circuits; and
    a second bias voltage generation unit that generates bias voltages in the source follower circuits.

12. The solid-state imaging device according to claim 11, wherein the load circuit includes a load transistor operating as a constant current source in each of the columns.

13. The solid-state imaging device according to claim 12, wherein
    the first bias voltage generation unit includes a first bias transistor that generates the bias voltages, and
    the second bias voltage generation unit includes a second bias transistor that generates the bias voltages.

14. The solid-state imaging device according to claim 13, comprising:
    a first bias voltage transmission wire that is provided for the first bias voltage generation unit and configured to transmit the bias voltages to a load transistor in a first column; and
    a second bias voltage transmission wire that is provided for the second bias voltage generation unit and configured to transmit the bias voltages to a load transistor in a second column.

15. The solid-state imaging device according to claim 14, wherein
    a gate of the load transistor in the first column is connected to the first bias voltage transmission wire,
    a drain of the load transistor in the first column is connected to the vertical signal wire in the first column, a source of the load transistor in the first column is connected to a ground potential, a gate of the load transistor in the second column is connected to the second bias voltage transmission wire, a drain of the load transistor in the second column is connected to the vertical signal wire in the second column, and a source of the load transistor in the second column is connected to a ground potential.

16. The solid-state imaging device according to claim 15, wherein a gate of the first bias transistor is connected to the first bias voltage transmission wire, a drain of the first bias transistor is connected to a power source potential via a first resistor, a source of the first bias transistor is connected to a ground potential, a gate of the second bias transistor is connected to the second bias voltage transmission wire, a drain of the second bias transistor is connected to a power source potential via a second resistor, and a source of the second bias transistor is connected to a ground potential.

17. The solid-state imaging device according to claim 13, wherein a bias voltage transmission wire configured to transmit the bias voltages to the load transistors is shared by the first bias voltage generation unit and the second bias voltage generation unit.

18. The solid-state imaging device according to claim 17, wherein gates of the load transistors are connected to the bias voltage transmission wire, drains of the load transistors are connected to the vertical signal wires, and sources of the load transistors are connected to ground potentials.

19. The solid-state imaging device according to claim 18, wherein gates of the first bias transistor and the second bias transistor are connected to the bias voltage transmission wire, a drain of the first bias transistor is connected to a power source potential via a first resistor, a drain of the second bias transistor is connected to a power source potential via a second resistor, and sources of the first bias transistor and the second bias transistor are connected to ground potentials.

20. The solid-state imaging device according to claim 11, wherein each of the pixels includes:

a photodiode that accumulates photoelectric-converted charges;

a row selection transistor that selects the pixels in a row direction;

an amplification transistor that detects a signal read from the photodiode;

a reset transistor that resets a signal read from the photodiode; and a read transistor that reads a signal from the photodiode.

* * * * *